No. 755,740. PATENTED MAR. 29, 1904.
H. W. BUCK.
SYSTEM OF ELECTRICAL DISTRIBUTION.
APPLICATION FILED SEPT. 4, 1902.
NO MODEL.
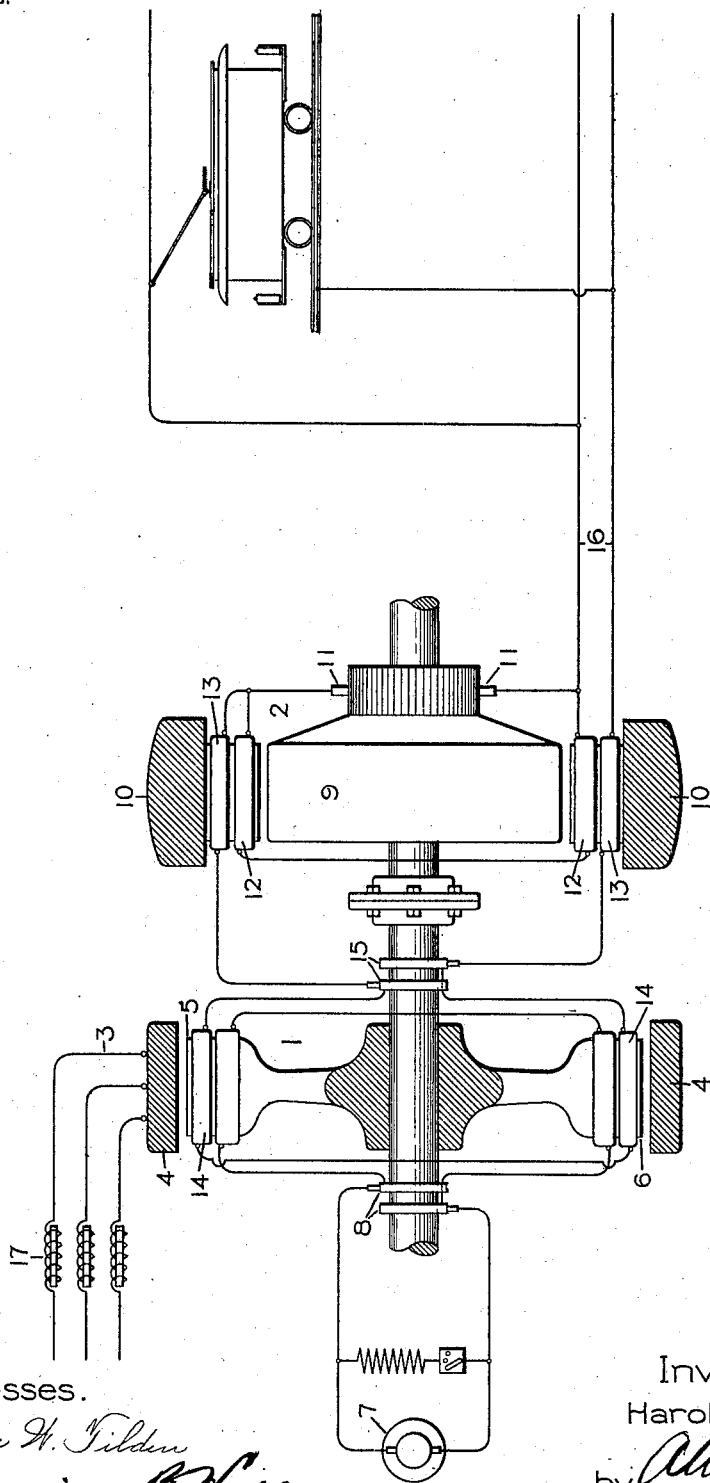
Witnesses.
George H. Tilden
Benjamin B. Hill
Inventor.
Harold W. Buck.
by Allen ...
Att'y.

No. 755,740. Patented March 29, 1904.

UNITED STATES PATENT OFFICE.

HAROLD W. BUCK, OF NIAGARA FALLS, NEW YORK, ASSIGNOR TO GENERAL ELECTRIC COMPANY, A CORPORATION OF NEW YORK.

SYSTEM OF ELECTRICAL DISTRIBUTION.

SPECIFICATION forming part of Letters Patent No. 755,740, dated March 29, 1904.

Application filed September 4, 1902. Serial No. 122,067. (No model.)

*To all whom it may concern:*

Be it known that I, HAROLD W. BUCK, a citizen of the United States, residing at Niagara Falls, county of Niagara, State of New York, have invented certain new and useful Improvements in Systems of Electrical Distribution, of which the following is a specification.

Rotary converters have come into common use in transforming alternating current into direct current, and when so used they constitute a convenient means whereby the voltage of the alternating-current system, and consequently that of the direct-current system connected to the converter, may be regulated in response to the direct-current load. Under certain conditions, however, and particularly when the frequency of the alternating current supplied is relatively high—as, for example, sixty cycles—the rotary converter is no longer satisfactory for reasons unnecessary for present purposes to enumerate. In place of rotary converters motor-generator sets consisting each of a synchronous alternating-current motor driving a direct-current generator may be employed. With such a motor-generator set the voltage of the direct-current generator is independent of the alternating-current voltage, so that no regulation of the alternating-current system is necessary to secure constant voltage on the direct-current system. In many cases, however, it is desirable that the voltage of the alternating-current system be compounded for changes of load on the direct-current system, thereby preventing the voltage of the alternating-current system from being affected to too great a degree by fluctuations of load on the direct-current system. To secure this result, I provide the field of the synchronous motor with a supplemental winding, through which the main current from the direct-current generator driven thereby is passed. The variation in field excitation of the synchronous motor as the load changes on the generator thus varies the phase displacement of the alternating current, thereby securing by phase control the desired regulation of voltage on the alternating-current system.

The novel features which I believe characterize my invention I have set forth with particularity in the claims appended hereto, while in the following description, which is to be taken in connection with the accompanying drawing, I have disclosed by way of illustration one of the various forms in which my invention may be embodied in practice.

In the drawing I have represented a motor-generator set consisting of the synchronous alternating-current motor 1, direct connected to a compound-wound direct-current generator 2. The alternating-current-supply mains or feeders for the synchronous motor are indicated at 3 and convey current, which in the present instance may be three-phase current, to a suitable three-phase winding of any ordinary and well-known construction carried by the stationary member 4 of the motor. Inasmuch as this winding presents no novel features, it has not been considered necessary to illustrate the same in any detail. The rotating member of the motor carries a suitable number of radially-arranged field-poles, such as at 5 and 6, the construction being one well understood in the art. These field poles or magnets are excited by direct current obtained from any suitable source—as, for example, from a separate exciter 7—from which current is conveyed through the instrumentality of collector-rings 8, mounted on the shaft of the rotary member of the motor 1.

The direct-current generator 2 differs in no respect from an ordinary compound-wound generator. The armature is represented at 9 and the compound-wound field at 10. The ordinary shunt-winding, which is connected across the brushes 11 of the machine, is indicated at 12, and a series or compounding winding, through which the main current of the generator passes, is shown at 13. This winding is also in series with a supplemental or compounding winding 14 on the field of the synchronous motor 1, as indicated, the electrical connections between the two being effected through the instrumentality of two collector-rings 15 and brushes, as indicated. The mains 16, extending from the direct-current generator, may supply current to a railway system, as shown, or to any other suitable translating devices—such, for example, as electric lights, motors, or the like. As the load varies on the direct-current system the excitation of the compounding winding 14 on the synchronous motor correspondingly changes thereby producing a change in the angle of lag or lead, as the case may be, of the current flowing in the alternating-current system, which phase shifting operates to produce a regulation of the alternating-current voltage. By a suitable proportioning of the various elements of the system thus described this regulation may be such as to maintain a constant voltage on the alternating-current system or a voltage rising with the load, as may be desired. To assist in obtaining this effect in case the inductance of the alternating-current system be not sufficiently high, inductance-coils 17 may be placed in the alternating-current leads, as indicated, in order to supply the inductance artificially.

What I claim as new, and desire to secure by Letters Patent of the United States, is—

1. The combination with a motor-generator set for transferring energy between an alternating-current system and a direct-current system, said motor-generator set having a motor-winding and a generator-winding, of means for regulating the voltage on the alternating-current system in response to variation of load on the direct-current system.

2. The combination of a synchronous alternating-current motor, a direct-current generator coupled thereto, and means for varying the field excitation of said motor in response to variation of load on said generator.

3. The combination of a synchronous alternating-current motor, a direct-current generator driven thereby, translating devices fed by said generator, a winding on the field of said motor, and means for passing through said winding current flowing from said generator to said translating devices.

4. The combination of a synchronous alternating-current motor, a generator driven thereby, means for supplying a substantially constant excitation to the field of said motor, and means for superposing upon said excitation a supplemental excitation variable in response to variation of load on said generator.

5. The combination of a synchronous alternating-current motor, a generator driven thereby, inductive supply-mains leading to said motor, and means for varying the excitation of said motor in response to variation of load on said generator, thereby producing a regulation of voltage in the alternating-current system.

6. The combination of an alternating-current motor of the synchronous type having an internal revolving field, a direct-current generator driven thereby, and means for passing current in series with the leads of said generator around a winding on the field of said motor.

In witness whereof I have hereunto set my hand this 2d day of September, 1902.

HAROLD W. BUCK.

Witnesses:
 WM. M. BLAIR,
 K. M. KELLEHER.